United States Patent
Konig et al.

(10) Patent No.: US 9,522,349 B2
(45) Date of Patent: Dec. 20, 2016

(54) METHOD FOR PROCESSING A PRODUCT SUPPLIED IN ONE OF A CONTINUOUS AND A DISCONTINUOUS CYCLIC VOLUME STREAM TO A SEPARATOR

(75) Inventors: Julian Konig, Paderborn (DE); Bernd Terwey, Coesfeld (DE); Wilfried Mackel, Lippetal-Herzfeld (DE); Andreas Penkl, Lippetal (DE); Thomas Bathelt, Oelde (DE); Kathrin Quiter, Drensteinfurt (DE)

(73) Assignee: GEA Mechanical Equipment GmbH, Oelde (DE)

( * ) Notice: Subject to any disclaimer, the term of this patent is extended or adjusted under 35 U.S.C. 154(b) by 472 days.

(21) Appl. No.: 13/989,272

(22) PCT Filed: Nov. 21, 2011

(86) PCT No.: PCT/EP2011/070528
§ 371 (c)(1),
(2), (4) Date: Nov. 13, 2013

(87) PCT Pub. No.: WO2012/069398
PCT Pub. Date: May 31, 2012

(65) Prior Publication Data
US 2014/0083954 A1 Mar. 27, 2014

(30) Foreign Application Priority Data
Nov. 23, 2010 (DE) .......................... 10 2010 052 301

(51) Int. Cl.
*B01D 21/26* (2006.01)
*B04B 1/08* (2006.01)
(Continued)

(52) U.S. Cl.
CPC ............... *B01D 21/262* (2013.01); *B04B 1/08* (2013.01); *B04B 5/10* (2013.01); *B04B 11/02* (2013.01); *B04B 11/04* (2013.01)

(58) Field of Classification Search
CPC ............ B04B 1/08; B04B 11/02; B04B 11/04; B04B 5/10; B04B 22/262; B04B 21/262
(Continued)

(56) References Cited

U.S. PATENT DOCUMENTS 2,085,538 A * 6/1937 Lyons .............................. 494/37
2,626,728 A * 1/1953 Harper ............................ 222/57
(Continued)

FOREIGN PATENT DOCUMENTS

DE          566 199       12/1932
DE          566199 C  *  12/1932  ............. B04B 11/02
(Continued)

OTHER PUBLICATIONS

DE 566199 Espacenet Machine Translation.*

*Primary Examiner* — Charles Cooley
*Assistant Examiner* — Shuyi S Liu
(74) *Attorney, Agent, or Firm* — Crowell & Moring LLP

(57) ABSTRACT

A method for processing a product is disclosed. The method includes providing a separator having a rotatable centrifugal drum and a plate assembly arranged in the drum. The product is supplied into the drum. One or more of a solids phase and at least two liquid phases are separated from the product. One or more of the at least two liquid phases and the solids phase is discharged out of the drum. The supplying of the product occurs in one of a continuous and a discontinuous cyclic volume stream performed at a constant cyclic frequency where the constant cyclic frequency has a period duration which is dependent on one or more of the parameters of an inner and outer radius of a plate, an inflow stream (Continued)

in an intermediate space between the plate and an adjacent plate, a plate angle, and a distance of the plate to the adjacent plate.

10 Claims, 4 Drawing Sheets

(51) Int. Cl.
*B04B 11/02* (2006.01)
*B04B 11/04* (2006.01)
*B04B 5/10* (2006.01)

(58) Field of Classification Search
USPC ..................................... 210/787; 494/11, 37
See application file for complete search history.

(56) References Cited

U.S. PATENT DOCUMENTS 3,044,625 A * 7/1962 Smith .................... B04B 11/04
                                                                200/61.2
4,069,969 A * 1/1978 Tanaka ............................. 494/3
5,277,109 A * 1/1994 Muench ........................ 100/112
5,288,713 A * 2/1994 Reese ............................ 210/696
5,356,366 A * 10/1994 Stahl .............................. 494/37

FOREIGN PATENT DOCUMENTS

DE          2626763 A * 12/1977 ............. B04B 11/04
WO      2005/065835     7/2005

* cited by examiner

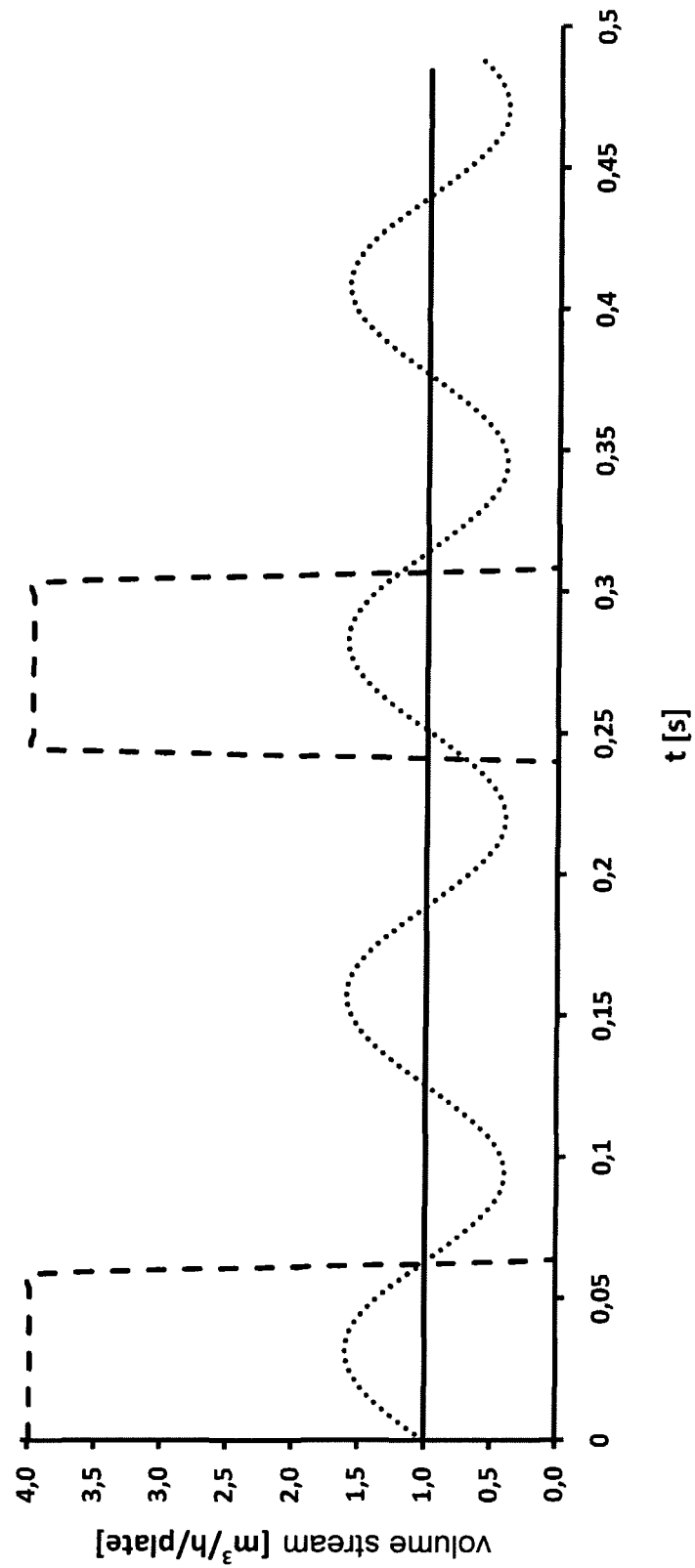

Fig. 3b

Particle diameter /Diameter of smallest grain size degree of separation Φ

METHOD FOR PROCESSING A PRODUCT SUPPLIED IN ONE OF A CONTINUOUS AND A DISCONTINUOUS CYCLIC VOLUME STREAM TO A SEPARATOR

CROSS-REFERENCE TO RELATED APPLICATION

This application is a national stage of International Application PCT/EP2011/070528, filed Nov. 21, 2011, and claims benefit of and priority to German Patent Application No. 10 2010 052 301.1, filed Nov. 23, 2010, the content of which Applications are incorporated by reference herein.

BACKGROUND AND SUMMARY

The present disclosure relates to a method for processing a free-flowing product, the method steps include: providing at least one separator having a vertical axis of rotation, a rotatable centrifugal drum, and a plate, or disk, assembly arranged in the drum; supplying the free-flowing product into the drum; separating one or more of a solid phase and at least two liquid phases from the free-flowing product; discharging one or more of the at least two liquid phases and the solid phase out of the drum. The present disclosure also relates to a centrifuge, in particular a separator. The separator includes: a separator drum having a vertical axis of rotation, at least one inflow to supply a product to be processed, at least a first outflow to discharge at least one liquid phase, and at least a second outflow to discharge a second liquid phase or a solids phase.

In separators having plate, or disk, assemblies, the separation of particles from a liquid or from volume streams occurs in the intermediate spaces of the plates, or disks, the so-called plate, or disk, gaps, under stationary conditions. This present disclosure relates to embodiments to optimize this mode of operation.

Thus, embodiments of the present disclosure provide an improved method for processing a liquid, and the embodiments also relate to a centrifuge which allows more effective processing of a liquid.

The present disclosure thus provides for a method for processing a free-flowing product. The method steps include: providing at least one separator having a vertical axis of rotation, a rotatable centrifugal drum, and a plate, or disk, assembly arranged in the drum; supplying the free-flowing product into the drum; separating one or more of a solid, or solids, phase and at least two liquid phases from the free-flowing product; discharging one or more of the at least two liquid phases and the solid phase out of the drum; and wherein the supplying of the free-flowing product occurs in one of a continuous and a discontinuous cyclic volume stream. The present disclosure also relates to a separator, the separator including a separator drum having a vertical axis of rotation, at least one inflow to supply a product to be processed, at least a first outflow to discharge at least one liquid phase, and at least a second outflow to discharge a second liquid phase or a solid or solids, phase; and a device for one of a continuous and a discontinuous cycling of an inflowing of a product volume stream into the separator drum.

According to the present disclosure, the method for processing, or for clarifying, a liquid using at least one separator, or centrifuge, which at least one centrifuge works in continuous operation. The at least one centrifuge, or separator, includes a plate, or disk, assembly. The method comprises at least the following steps:

supplying a free-flowing product into the centrifuge drum,
separating a solid, or solids, phase out of the liquid and/or separating the liquid into a plurality of liquid phases and/or one solid, or solids, phase, and discharging the liquid phase or phases and/or the solid, or solids phase out of the centrifuge drum,
wherein the supply of the product to be processed occurs in a continuous or a discontinuous cyclic volume stream.

Due to the cyclic supply of the product to be processed into the centrifuge drum, a cyclic inflow stream is produced in the plate, or disk, gaps or the intermediate spaces between the plates, or disk, in the centrifuge. Thus, in the respective plate, or disk, gap a fluctuating volume stream is formed or a volume stream which is temporarily reduced starting from a maximum and/or it completely comes to a stop. "Cyclic" means that the inflow stream is repeatedly changed "again and again a plurality of times or multiple times", and either with constant cyclic frequency per unit of time or not with constant cyclic frequency. Nonetheless, the frequency is a plurality of times per unit of time T1, for example, 1 minute or 1 second.

In the low-flow or flow-free time intervals, the slipping of the deposited particles off of the plate, or disk, surface into the drum interior is promoted.

A product volume V1 may, for example, be supplied over a period of time T1 of defined length, wherein the supply of the product to be processed is performed in cyclic operation in such a manner that the product volume V1 conducted into the drum per period of time T1 does not change or remains constant in relation to a supply in the non-cyclic operation. This is advantageous, for example, since overall the processing speed is not reduced in relation to non-cyclic operation but nonetheless the advantages of cyclic operation are utilized.

Furthermore, it is particularly expedient if the supply of the product to be processed is performed in a cyclic manner such that an increase and decrease of the inflow stream around a mean value occurs as a function of the time, for example, such that the inflow stream is not completely interrupted in cyclic operation.

It is known from WO 2005/065835 A1 that to avoid clogs of the flow paths of a separator during the separation of milk into cream and skim milk, the concentration of the fat content of an outflowing product phase is ascertained and the partition zone is shifted by a short-term change of the operating parameters such as the inflow performance, if a limiting value is exceeded. The inflow performance is only increased for a short time once in this case, however, if a clog occurs. That is, only in the exceptional case if a limiting value is exceeded.

In addition, in a centrifuge having a closed housing, performing the supply of the product under pressure intermittently while simultaneously closing the discharge line of the liquid is known from DE 566 199 PA. This is also used to loosen clogs. In contrast to the embodiments of the present disclosure, however, the discharge line is closed during the intermittent supply. According to the embodiments of the present disclosure, the diameter of the discharge line for the liquid phase or phases remains unchanged, in contrast. That is, the supplied product volume stream is cyclically supplied, without the discharge line or lines for the liquid phase or phases being closed or additionally throttled. This is because according to embodiments of the present disclosure, the changed deposition behavior in the plate gap is used, wherein no cycling of the product discharge is necessary.

Embodiments of the present disclosure are discussed further herein and in the appended claims.

Other aspects of the present disclosure will become apparent from the following descriptions when considered in conjunction with the accompanying drawings.

BRIEF DESCRIPTION OF THE DRAWINGS

FIGS. 3a and 3b show graphs of the degree of separation in cyclic and non-cyclic volume streams, according to embodiments of the present disclosure.

DETAILED DESCRIPTION

Figure 1:
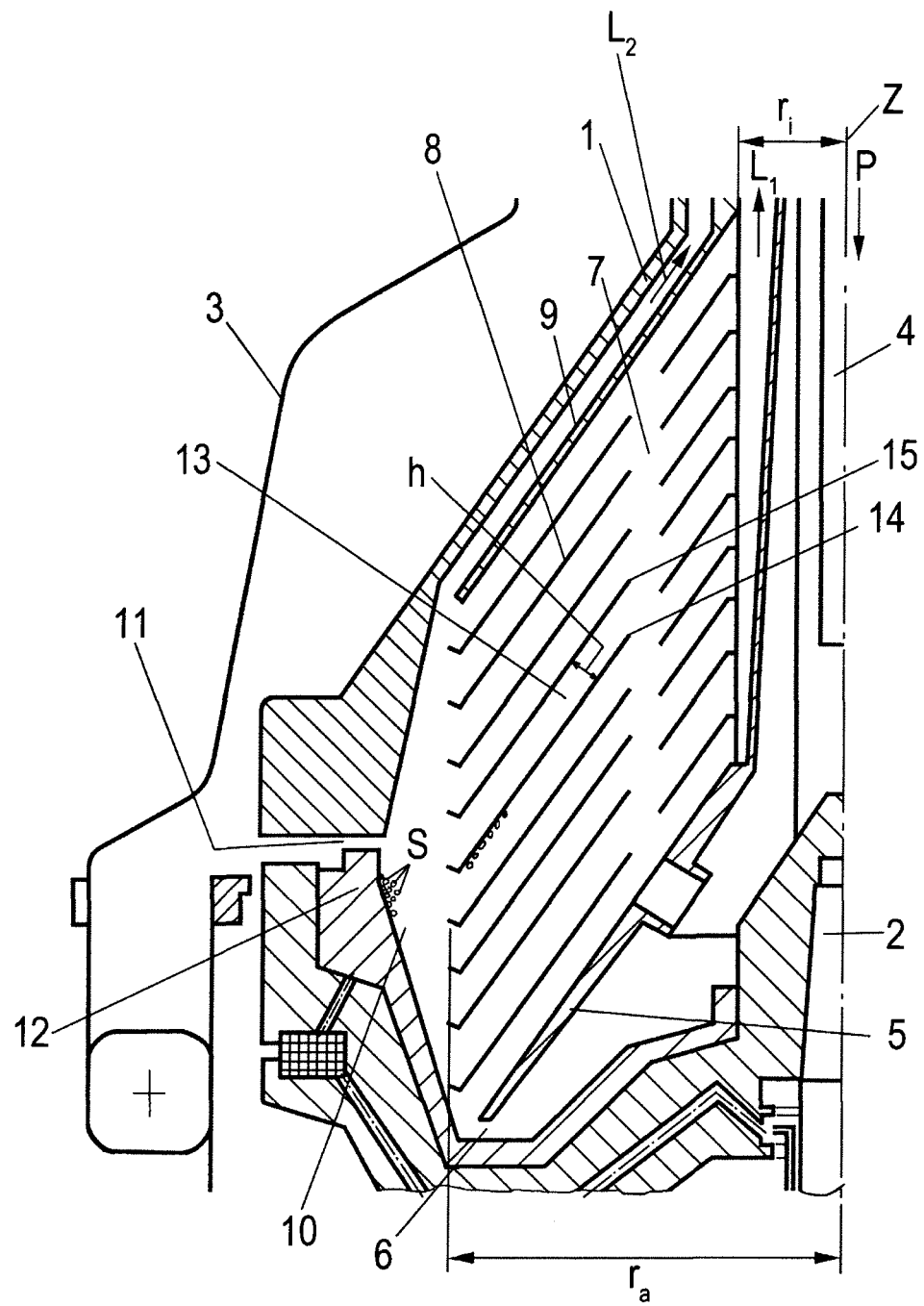
FIG. 1 shows a partial sectional view of a schematically illustrated separator drum, in accordance of an embodiment of the present disclosure.

FIG. 1 shows a centrifuge drum, or separator drum 1, having a vertically aligned axis of rotation Z.

The rotatable separator drum 1 is placed on a drive spindle 2, which is driven directly or via a belt (not shown), for example, and which is mounted so it is rotatable. The drive spindle 2 is conically formed in its upper circumferential region. The separator drum 1 is enclosed by a stationary hub or hood 3, which does not rotate with the drum 1. The advantageously double-conical separator drum 1 has an intake having an inflow pipe 4 for a product P to be processed. The inflow pipe 4 is adjoined by a distributor 5 having one or more outlet openings 6 through which the inflowing product or feedstock is conducted into the interior of the separator drum 1 and into a plate, or disk, assembly 8. The plate assembly 8 may, for example, be terminated on top by a separator plate, or disk, 9. Conduction from the distributor 5 into a riser channel 7 of plate assembly 8 is, alternatively, within the scope of the present disclosure. A partition plate or disk assembly may be, for example, arranged in the separator drum 1.

The operation is continuous. That is, during the processing of the feedstock, the feedstock is continuously processed and continuously discharged from the centrifuge. In contrast to a closed machine, as in DE 566 199 PS, solids are discharged from the drum 1 during the clarifying by opening a piston valve 12 or through nozzles without the rotation of the drum 1 having to be interrupted and the housing of the drum 1 having to be opened for this purpose.

In the centrifugal field, a combined separation and/or clarification of the inflowing free-flowing product is performed into two liquid phases, L1 and L2, of different weights and one solid, or solids phase S.

The solids phase S is transported, as suggested in FIG. 1, after the deposition in the plate assembly 8 into a solids discharge chamber 10 and discontinuously discharged therefrom through solids discharge openings 11, which openings 11 can be opened and closed with the aid of a piston valve 12. However, the operation of the centrifuge, that is, the actual processing of the feedstock, is nonetheless performed in continuous operation, since the solids can be discharged again and again, without the rotation of drum 1 having to be interrupted for this purpose.

The lighter liquid phase L1 is conducted out of the drum 1 at an inner radius $r_i$ using a first shell device (not shown). The heavy liquid phase L2, in contrast, flows around the outer circumference of the separation plate 9 and is discharged through a second shell device (not shown) out of the separator drum 1.

Figure 2:
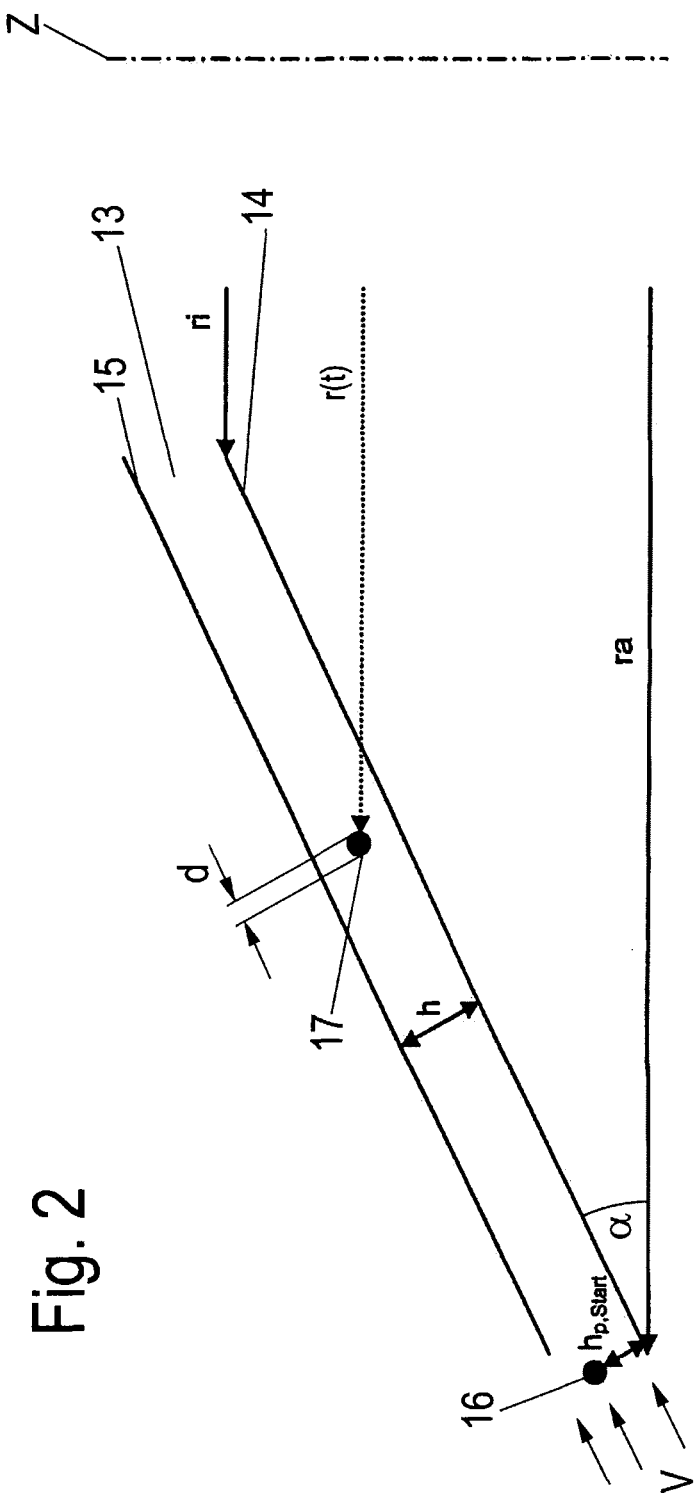
FIG. 2 shows a schematic illustration of a plate gap, in accordance with an embodiment of the present disclosure.

FIG. 2 schematically shows a plate gap, that is, the intermediate space 13 between two adjacent plates, or partition plates, 14 and 15 of the plate assembly 8. The inflow stream is part of the supplied volume stream, which flows into a plate gap 13, for example, between radial tabs which hold the plates 14, 15 spaced apart from one another in the axial direction and which, for example, may subdivide the plate gaps 13 into segments.

In FIG. 2, the inflow stream has two particles, wherein a first particle 16 is located at the outer radius $r_a$ of the plates 14 and 15, which are spaced apart from one another at a gap width h. A second particle 17 is located directly between the plates 14 and 15 and at the point in time t has a radius r(t) to the axis of rotation Z, which is less than the outer radius $r_a$ of the plates 14 or 15 and is greater than the inner radius $r_i$ of the plate 14.

The inflow stream is directed from the outer radius $r_a$ of the plates 14 or 15 in the direction of the inner radius $r_i$, wherein solids fractions, such as the particles 16 and 17, are deposited on the partition plates 14, 15. The solids particles slip off therefrom because of the angle of inclination α of the plate 14 into a solid, or solids, discharge chamber 10.

Separation procedures occur according to the prior art, during a continuous inflow stream into the plate gap and is performed under substantially stationary conditions. However, in accordance with embodiments of the present disclosure, it has advantageously been shown that non-stationary inflow streams can result in improved separation behavior.

Further discussion of such advantage follows.

A small particle initially floats along in the inflow stream with negligibly small acceleration affects. The velocity v of the inflow stream or the particle may be described as a function of the distance covered in the radial direction r(t) in a specific time t via the inflow stream per plate gap $Q_T$ and the lateral surface of a plate gap A as follows:

$$v_{p,r} = \frac{\partial r}{\partial t} = \frac{Q_T}{A}$$

The lateral surface is a function of the radius r of the particle to the axis of rotation Z, the gap width h of the plate gap, and the angle of inclination α of the plate, where $$A = 2\pi r \frac{h}{\cos\alpha}$$

If the lateral surface A is considered, a first-order differential equation therefore results for the velocity of the particle and the inflow stream at the radius r:

$$\dot{r} = \frac{Q_T}{2\pi r h}\cos\alpha$$

By solving under the boundary condition $r(t=0)=r_a$ and in consideration of the flow direction of the inflow stream in the plate gap, the following equation results for the radial particle distance to the axis of rotation Z over the time t:

$$r(t) = \sqrt{r_a^2 - \frac{Q_T t \cos\alpha}{\pi r h}}$$

The maximum time, $T_{end}$, which a particle remains in the gap if $r(t)=r_i$ is as follows:

$$T_{end} = \frac{(r_a^2 - r_i^2)\pi h}{Q_T \cos\alpha}$$

The sink rate of the particle in the centrifugal field is dependent on its radial distance to the axis of rotation and therefore is also dependent on the time, wherein $\Delta\varphi$ is the density difference between solids and liquid, d is the particle diameter, $\omega$ is the angular velocity, and $\eta$ is the dynamic viscosity of the liquid.

$$v_{sink}(t) = \frac{d^2 \Delta\varphi\omega^2 r(t)}{18\eta} = \frac{d^2 \Delta\varphi\omega^2 \sqrt{r_a^2 - \frac{Q_T t \cos\alpha}{\pi h}}}{18\eta}$$

The separation path h(T), which is covered by the particle perpendicularly within a specific time, is a function of the sinking velocity and reads:

$$h_p(T) = \frac{1}{T}\int_0^T v_{sink}(t)\partial t * T$$

The following results by integration and replacement of the time variables T by t:

$$h_p(t) = \frac{d^2 \Delta\varphi\omega^2 \pi h \sin\alpha}{27\eta Q_T \cos\alpha}\left[r_a^3 - \sqrt{\left(r_a^2 - \frac{Q_T t \cos\alpha}{\pi h}\right)^3}\right]$$

A particle is considered to be separated when it has reached the upper plate of the plate gap in the time t. A particle is therefore separated if $$h_{p,Start} + h_p(t) \geq h$$

where $t = T_{end}$ is fulfilled.
Therefore:

$$h - h_{p,Start} \leq \frac{d^2 \Delta\varphi\omega^2 \pi h \tan\alpha}{27\eta Q_T}[r_a^3 - r_i^3]$$

The degree of separation as a function of the diameter of the particle $\phi(d)$ can therefore be expressed via the following equation:

$$\phi(d) = \frac{h}{h_{p,Start}} = \frac{d^2 \Delta\varphi\omega^2 \pi h \tan\alpha[r_a^3 - r_i^3]}{27\eta Q_T}$$

The degree of separation $\phi(d)$ can be numerically solved more easily using a time step method for non-stationary inflow streams $Q_T(t)$ with various functions.

FIG. 3a illustrates various variants of a control with respect to volume of the inflow stream as a function of time. For example, the inflow stream is 1 m³/h per plate here.

The known case of a continuous inflow stream is shown as a solids line.

A dashed line shows a temporary, complete interruption of the inflow stream. For example, four times the quantity is supplied here for a short time, interrupted by a fourfold pause. Overall, the inflow stream is, therefore, again 1 m³/h per plate.

The dotted line shows a sinusoidal increase and decrease of the inflow stream around a mean value as a function of the time, wherein the inflow stream is not completely interrupted. The inflow stream overall is again 1 m³/h per plate.

FIG. 3b shows a function of the degree of separation in relation to the particle diameter and near-size grain diameter, or the cut of the grain size. It may be seen in this case that the near-size grain diameter of the separated particles worsens in the case, for example, of cyclic inflow (see the dashed lines).

However, the advantages of the cyclic mode of operation predominate, since in this case, for example, the solids collect on the plate surface unobstructed by the volume stream and can slip off into the solids chamber 10 of the separator, which results overall in better clarification of a liquid.

In the case of a combination of two separators in a series circuit, for example, the negative shift of the degree of separation shown in FIGS. 3a and 3b can be completely canceled out by the combination of two separators. That is, the combination of one separator which is charged non-cyclically and one separator which is charged cyclically, and nonetheless better clarification can be performed in relation to a series circuit made of two non-cyclic separators.

The cycling should ideally have a period duration of $$T_{end} = \frac{(r_a^2 - r_i^2)\pi h}{\overline{Q}_T \cos\alpha}$$

wherein $\overline{Q}_T$ in this case, for example, is the average inflow stream per plate. The frequency of the cycling should be low for better control of the process. It is thus advantageous, according to the present disclosure, if the cycling has a frequency of less than 10 Hz, to avoid the hazard of averaging (f=1/T).

Alternatively to the trapezoidal shape shown in FIG. 3a, the shape of the inflow function in the case of constant cycling can also be a sinusoidal shape, triangular shape, rectangular shape, or a sawtooth shape, in accordance with the present disclosure.

According to the present disclosure, a centrifuge, for example, a separator, has means or a device which allows cycling of the inflow of the volume stream of a liquid to be processed.

Such means may include, for example, an inlet having an inflow pipe 4, which is implemented as angled in the region of the distributor 5, wherein the cycling results per rib in the distributor 5.

Alternatively or additionally, in accordance with the present disclosure, such means may include a differential gearing, which is arranged between the inlet pipe 4 and the drum 1 of the centrifuge, or separator. The period duration of the cycling is predefined depending on the pitch of the differential gearing.

Alternatively or additionally, in accordance with the present disclosure, a regulating valve, for example, a rotating ball head valve, can be arranged on or in the inflow, for example, in the flow direction outside or upstream of the drum 1, or the inflow can be performed by a piston pump having constant cycling.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A method for processing a free-flowing product, the method steps comprising:
   providing at least one separator having a vertical axis of rotation, a rotatable centrifugal drum, and a plate assembly arranged in the drum;
   supplying the free-flowing product into the drum;
   separating one or more of a solids phase and at least two liquid phases from the free-flowing product;
   discharging one or more of the at least two liquid phases and the solids phase out of the drum;
   wherein the supplying of the free-flowing product occurs in one of a continuous and a discontinuous cyclic volume stream;
   wherein the supplying of the free-flowing product is performed at a constant cyclic frequency and wherein the constant cyclic frequency has a period duration T which is dependent on one or more of the following parameters:
   a) an inner radius (ri) of a plate of the assembly;
   b) an outer radius (ra) of the plate;
   c) an inflow stream (QT) in an intermediate space between the plate and an adjacent plate;
   d) a plate angle (α); and
   e) a distance (h) of the plate to the adjacent plate;
   and wherein the period duration T of the cycling of the volume stream is less than a time Tend in which a particle remains in the intermediate space between the plate and the adjacent plate, wherein $$T_{end} = \frac{(r_a^2 - r_i^2)\pi h}{Q_T \cos\alpha},$$

wherein ra is the outer radius of the plate, ri is the inner radius of the plate, h is the distance of the plate to the adjacent plate, and wherein QT is the average inlet stream per plate and α is the plate angle.

2. The method according to claim 1, further comprising the step of one or more of monitoring, controlling, and regulating the cyclic frequency.

3. The method according to claim 1, wherein the period duration T is greater than ten times Tend.

4. The method according to claim 1, further comprising the step of pre-clarification of the free-flowing product to be clarified, which step is performed before the supplying of the free-flowing product and which pre-clarification step occurs in a first different separator having a non-cyclic flow.

5. The method according to claim 1, further comprising the step of post-clarification of one or more of the liquid phases performed following the step of discharging, and wherein the post-clarification occurs in a second different separator having a non-cyclic inflow.

6. The method according to claim 1, wherein a product volume V1 of the free-flowing product is supplied over a period of time T1 of defined length, wherein the supplying of the free-flowing product is performed in a cyclic operation in such a manner that the product volume V1 per period of time T1 is either not changed or remains constant in relation to a supply of the free-flowing product in a non-cyclic operation.

7. The method according to claim 1, wherein the supplying of the free-flowing product is performed cyclically in such a manner that an increase and decrease of the inflow stream around a mean value is performed as a function of time.

8. The method according to claim 1, wherein the supplying of the free-flowing product is performed in such a manner that the inflow stream is not completely interrupted in a cyclic operation.

9. The method according to claim 1, wherein the inflow stream is cyclically varied one of multiple times per minute and multiple times per second.

10. The method according to claim 1, wherein the inflow stream is varied sinusoidally.

* * * * *